(12) United States Patent
Jung et al.

(10) Patent No.: US 9,167,263 B2
(45) Date of Patent: Oct. 20, 2015

(54) METHODS AND DEVICES FOR IMAGE ENCODING AND DECODING, AND CORRESPONDING COMPUTER PROGRAMS

(75) Inventors: Joël Jung, Le Mesnil Saint Denis (FR); Jean-Marc Thiesse, Paris (FR)

(73) Assignee: Orange, Paris (FR)

( * ) Notice: Subject to any disclaimer, the term of this patent is extended or adjusted under 35 U.S.C. 154(b) by 703 days.

(21) Appl. No.: 13/502,821

(22) PCT Filed: Oct. 21, 2010

(86) PCT No.: PCT/FR2010/052245
§ 371 (c)(1),
(2), (4) Date: Apr. 19, 2012

(87) PCT Pub. No.: WO2011/051596
PCT Pub. Date: May 5, 2011

(65) Prior Publication Data
US 2012/0224631 A1      Sep. 6, 2012

(30) Foreign Application Priority Data

Oct. 27, 2009   (FR) ...................................... 09 57536

(51) Int. Cl.
| | | |
|---|---|---|
| H04N 19/467 | (2014.01) | |
| H04N 19/176 | (2014.01) | |
| H04N 19/70 | (2014.01) | |
| H04N 19/196 | (2014.01) | |
| H04N 19/61 | (2014.01) | |
| H04N 19/146 | (2014.01) | |
| H04N 19/18 | (2014.01) | |

(52) U.S. Cl.
CPC ........... *H04N 19/467* (2014.11); *H04N 19/146* (2014.11); *H04N 19/176* (2014.11); *H04N 19/18* (2014.11); *H04N 19/196* (2014.11); *H04N 19/61* (2014.11); *H04N 19/70* (2014.11)

(58) Field of Classification Search
None
See application file for complete search history.

(56) References Cited

U.S. PATENT DOCUMENTS

2004/0228404 A1    11/2004   Yu et al.

OTHER PUBLICATIONS

Giannoula et al., "Compressive data hiding for video signals," Proceedings of International Conference on Image Processing, IEEE, Piscataway, NJ, USA, vol. 1, pp. 529-532 (Sep. 14, 2003).

(Continued)

*Primary Examiner* — Geepy Pe
*Assistant Examiner* — William Adrovel
(74) *Attorney, Agent, or Firm* — Drinker Biddle & Reath LLP

(57) ABSTRACT

A method and device relate to coding an image split up into partitions, which comprises the selection of at least one mode of coding and of its associated coding information items, from among items placed in competition, the prediction of the data of a current partition, the determination of residual data. Calculation of the value of a function representative of said residual data are performed, then the comparison of said calculated value with a value selected as value of competition index from among the associated values. If the values are equal, said signal transmitted comprises said residual data and said associated coding information items. If not, the residual data determined are modified so that the value of the function representative of the residual data is equal to the selected value of competition index, the signal transmitted comprising the modified residual data, excluding the selected value of competition index.

12 Claims, 3 Drawing Sheets

(56) References Cited

OTHER PUBLICATIONS

Kang et al., "An error resilient coding scheme for H.264/AVC video transmission based on data embedding," Journal of Visual Communication and Image Representation, vol. 16(1), pp. 93-114 (Feb. 1, 2005).

Lin et al., "A Video Watermarking in H.264/AVC Encoder," Fifth International Conference on Intelligent Information Hiding and Multimedia Signal Processing, IEEE, Piscataway, NJ, USA, pp. 340-343 (Sep. 12, 2009).

Paruchuri et al., "Joint optimization of data hiding and video compression," IEEE International Symposium on Circuits and Systems, IEEE, Piscataway, NJ, USA, pp. 3021-3024 (May 18, 2008).

Wu et al., "Multimedia data hiding," Springer, New York, NJ, USA, pp. 33-34 (Jan. 1, 2003).

Zhu et al., "Media Compression via Data Hiding," Conference on Signals, Systems & Computers, Los Alamitos, CA, USA, vol. 1, pp. 647-651 (Nov. 2, 1997).

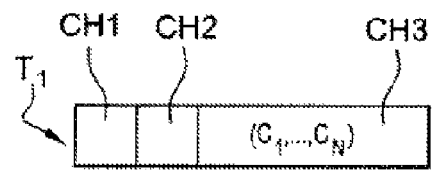
Fig. 4A
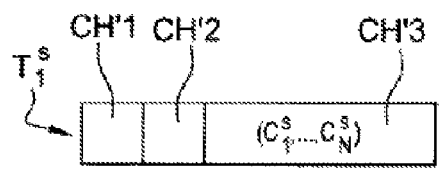
Fig. 4B
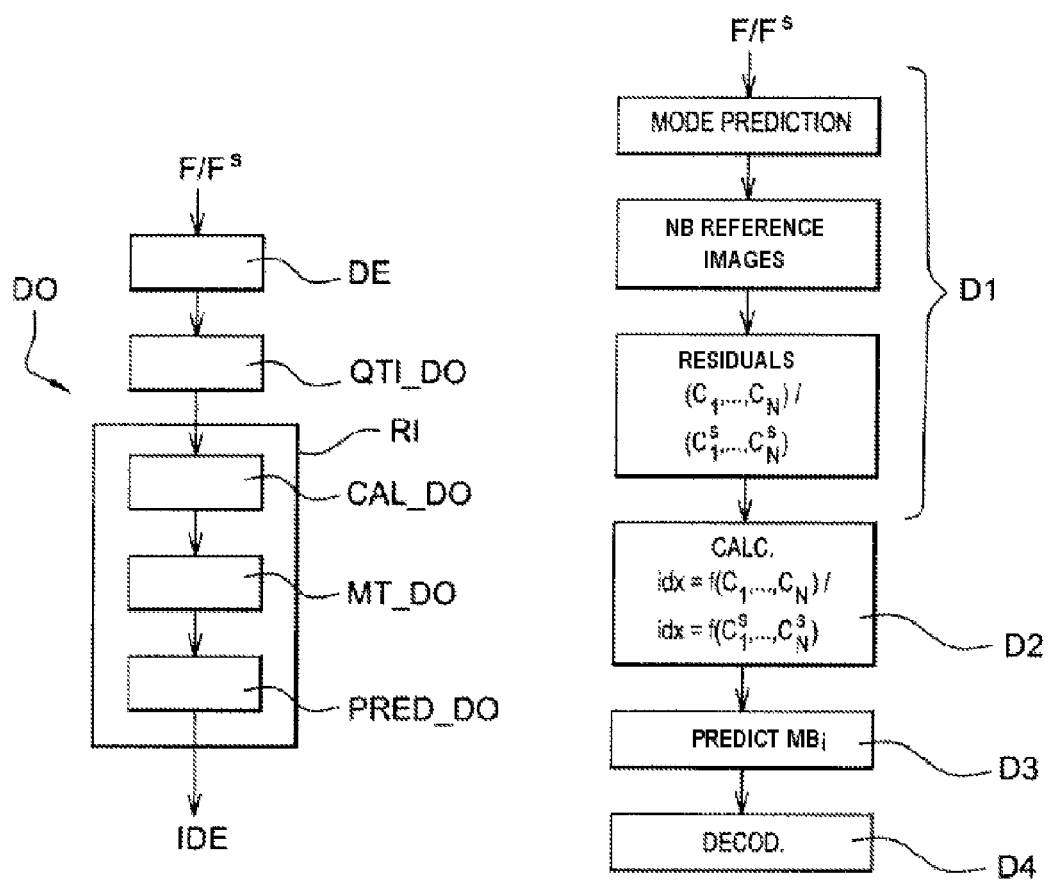
Fig. 5
Fig. 6

METHODS AND DEVICES FOR IMAGE ENCODING AND DECODING, AND CORRESPONDING COMPUTER PROGRAMS

CROSS-REFERENCE TO RELATED APPLICATIONS

This application is the U.S. national phase of the International Patent Application No. PCT/FR2010/052245 filed Oct. 21, 2010, which claims the benefit of French Application No. 09 57536 filed Oct. 27, 2009, the entire content of which is incorporated herein by reference.

FIELD

The present invention pertains generally to the field of image processing, and more precisely to the competition-based coding and decoding of digital images and of digital image sequences.

More precisely, the invention applies to the compression of images or video sequences using a block-wise representation of the video sequence.

The invention can be applied especially, but not exclusively, to the video coding implemented in current video coders and their amendments (MPEG, H.264, H.264 SVC, H.264 MVC, etc) or forthcoming video coders (ITU-T/VCEG (H.265) or ISO/MPEG (HVC)), and to the corresponding decoding.

BACKGROUND

Digital images and image sequences occupy a great deal of space in terms of memory, thus making it necessary, when these images are transmitted, to compress them so as to avoid the problems of crowding on the communication network used for this transmission, the bitrate usable thereon generally being limited. This compression is also desirable with a view to the storage of these data.

Numerous video data compression techniques are already known. Among them, numerous video coding techniques, especially the H.264 technique, use techniques of spatial or temporal prediction of groups of blocks of pixels of a current image with respect to other groups of blocks of pixels belonging to the same image or to a preceding or following image.

More precisely, according to the H.264 technique, I images are coded by spatial prediction (intra prediction), and P and B images are coded by temporal prediction (inter prediction) with respect to other I, P or B images coded/decoded with the aid of motion compensation.

Such images are generally split up into macroblocks, themselves split up into partitions comprising a set of pixels (for example 8×8). For each partition is coded a residual partition, also called a prediction residual, corresponding to the original partition minus a prediction. After this predictive coding, the residual partitions are transformed by a transform of discrete cosine transform (DCT) type, and then quantized. The coefficients of the quantized residual partitions are thereafter scanned in an order of reading making it possible to utilize the significant number of zero coefficients in the high frequencies, and then coded by entropy coding.

In accordance with the invention, a partition can consist of a block of generally square or rectangular shape, or else have other shapes, such as linear, L-shaped, etc. A partition according to the invention can also have an entirely arbitrary shape.

According to the H.264 technique for example, when a macroblock is split up into blocks, a data signal, corresponding to each block, is transmitted to the decoder. Such a signal comprises:

residual data which are the coefficients of the quantized residual blocks and optionally, during a coding in Inter mode, residual data of the motion vectors, information items representative of the mode of coding used, in particular:
- the mode of prediction (intra prediction, inter prediction, default prediction carrying out a prediction for which no information item is transmitted to the decoder (known as "skip"));
- information items specifying the type of prediction (orientation, reference image, . . . );
- the type of partitioning;
- the type of transform, for example 4×4 DCT, 8×8 DCT, etc . . . .
- the motion information items if necessary;
- etc.

The decoding is done image by image, and for each image, macroblock by macroblock. For each partition of a macroblock, the corresponding elements of the stream are read. The inverse quantization and the inverse transformation of the coefficients of the blocks are performed. Next, the prediction of the partition is calculated and the partition is reconstructed by adding the prediction to the decoded prediction residual.

Competition-based intra or inter coding, such as implemented in the H264 standard, thus relies on placing various coding information items, such as those aforementioned, in competition with the aim of selecting the best mode, that is to say that which will optimize the coding of the partition considered according to a predetermined performance criterion, for example the rate/distortion cost, well known to the person skilled in the art.

The information items representative of the mode of coding selected are contained in the data signal transmitted by the coder to the decoder, in the form of identifiers generally called competition indices. The decoder is thus capable of identifying the mode of coding selected at the coder, and then of applying the prediction in accordance with this mode.

The bandwidth allocated to these competition indices is not negligible. Moreover it tends to increase because of the ever expanding enrichment of the information items representative of the mode of coding used.

SUMMARY

One of the aims of the invention is to remedy drawbacks of the aforementioned prior art.

For this purpose, a subject of the present invention relates to a method for coding an image split up into partitions, the method implementing the steps of:
- selection of at least one mode of coding and of its associated coding information items from among a plurality of n_i coding information items in competition;
- prediction, with the aid of the selected mode of coding, of the data of a current partition as a function of at least one already coded partition, termed a reference partition, delivering a predicted partition;
- determination of residual data, by comparing data relating to the current partition and to the predicted partition;
- transmission of a data signal comprising at least the determined residual data and the coding information items associated with the mode of coding selected.

The coding method according to the invention is noteworthy in that, prior to the transmission step, the method implements the steps of:
- calculation of the value of a function representative of the residual data determined, comparison of the calculated value with the value of at least an ith of the coding information items associated with the mode of coding selected, in case of equality between the two calculated values, the data signal transmitted comprises the residual data determined and the coding information items associated with the mode of coding selected, with the exclusion of the coding information item whose value has been compared, in case of inequality between the two calculated values, modification of the determined residual data so that the value of the function representative of the residual data is equal to the value of said coding information item whose value has been compared, the data signal transmitted comprising the modified residual data and the coding information items associated with the mode of coding selected, with the exclusion of the coding information item whose value has been compared.

Such a provision thus makes it possible during competition-based coding, to avoid including at least one competition index arising from the plurality of competition indices to be transmitted, in the signal to be transmitted to the decoder.

Such a provision moreover makes it possible despite everything to preserve an optimal prediction while limiting the occupancy of the bandwidth.

According to a particular embodiment, in the case where the compared value is that of one of the n_i coding information items in competition, the step of calculating the value of the function representative of the residual data consists in calculating the modulo n_i of the sum of the residual data determined.

According to another particular embodiment, in the case where the compared value is that of one of the n_i coding information items in competition, the step of calculating the value of the function representative of the residual data consists in calculating a number $n'\_i \leq n\_i+1$ of determined residual data which are equal in succession.

The two aforementioned provisions make it possible to choose the modification of the residual data which is optimal in regard to the rate-distortion performance criterion.

According to yet another particular embodiment, the coding method comprises the steps of:
  calculation of the value of a coding performance criterion at each modification of at least one of the determined residual data,
  selection of the modification of the residual datum which corresponds to the highest calculated value of the performance criterion.

Such a provision makes it possible to yet further refine the optimization of the prediction, in terms of coding cost ("bitrate") and of quality of the image to be reconstructed.

According to yet another particular embodiment, when the image is split up into at least two partitions, one of which is not associated with any coding information item, the value of the function representative of the residual data is calculated on the basis of the residual data of the two partitions.

In a corresponding manner, the invention also relates to the decoding of a data signal representative of an image split up into partitions which has been previously coded, such a signal comprising residual data relating to at least one previously coded partition and coding information items associated with a mode of coding of the aforementioned partition.

Such a decoding is noteworthy in that the value of at least one coding information item for the aforementioned partition is obtained by calculating the value of a function representative of the decoded residual data.

According to a particular embodiment, the step of calculating the value of the function representative of the decoded residual data consists in calculating the modulo n_i of the sum of the decoded residual data.

According to another particular embodiment, the step of calculating the value of the function representative of the residual data consists in calculating a number $n'\_i \leq n\_i+1$ of decoded residual data equal in succession.

The invention further relates to a device for coding an image split up into partitions, the device comprising:
  means for selecting at least one mode of coding and its associated coding information items from among a plurality of n_i coding information items in competition;
  means for predicting, with the aid of the selected mode of coding, the data of a current partition as a function of at least one already coded partition, termed the reference partition, so as to deliver a predicted partition;
  means for determining residual data, by comparing data relating to the current partition and to the predicted partition;
  means for transmitting a data signal comprising at least the determined residual data and the coding information items associated with the mode of coding selected.

Such a coding device is noteworthy in that it comprises:
processing means which are linked between the means for determining residual data and the transmission means, the processing means being able to calculate the value of a function representative of the residual data determined and to compare the calculated value with the value of at least one of the coding information items associated with the mode of coding selected, in such a way that:
  in case of equality between the two calculated values, the data signal intended to be transmitted by the transmission means contains the residual data determined and the coding information items associated with the mode of coding selected, with the exclusion of the coding information item whose value has been compared,
  in case of inequality between the two calculated values, the processing means modify the residual data determined so that the value of the function representative of the residual data is equal to the value of the coding information item whose value has been compared, the data signal intended to be transmitted by the transmission means containing the modified residual data and the coding information items associated with the mode of coding selected, with the exclusion of the coding information item whose value has been compared.

The invention also relates to a device for decoding a data signal representative of an image split up into partitions which has been previously coded, such a signal comprising residual data relating to at least one previously coded partition and coding information items associated with a mode of coding of the aforementioned partition.

Such a decoding device is noteworthy in that it comprises calculation means for obtaining the value of at least one coding information item for the aforementioned partition by calculating the value of a function representative of the decoded residual data.

The invention further relates to a computer program comprising instructions for implementing one of the methods according to the invention, when it is executed on a computer.

The invention is also aimed at a computer program on an information medium, this program comprising instructions adapted to the implementation of one of the methods according to the invention, such as are described hereinabove.

This program can use any programming language, and be in the form of source code, object code, or of code intermediate between source code and object code, such as in a partially compiled form, or in any other desirable form.

The invention is also aimed at an information medium readable by a computer, and comprising instructions of a computer program such as mentioned hereinabove.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The program according to the invention may in particular be downloaded from a network of Internet type.

Alternatively, the information medium may be an integrated circuit into which the program is incorporated, the circuit being adapted to execute or to be used in the execution of the method in question.

The decoding method, the coding device, the decoding device and the computer programs that were mentioned above exhibit at least the same advantages as those conferred by the coding method according to the present invention.

BRIEF DESCRIPTION OF THE DRAWINGS

Other characteristics and advantages will become apparent on reading a preferred embodiment described with reference to the figures in which:

FIG. 4A represents the structure of a partition coded by the coding device according to the invention, when the residual coefficients arising from the prediction are not modified, FIG. 4B represents the structure of a partition coded by the coding device according to the invention, when the residual coefficients arising from the prediction have been modified, FIG. 5 represents a decoding device according to the invention, FIG. 6 represents steps of the decoding method according to the invention.

DETAILED DESCRIPTION

An embodiment of the invention will now be described, in which the coding method according to the invention is used to code a sequence of images according to a binary stream much like that obtained with a coding according to the H.264/MPEG-4 AVC standard. In this embodiment, the coding method according to the invention is for example implemented in a software or hardware manner by modifications of a coder initially complying with the H.264/MPEG-4 AVC standard. The coding method according to the invention is represented in the form of an algorithm comprising steps C1 to C8, represented in FIG. 1.

Figure 2:
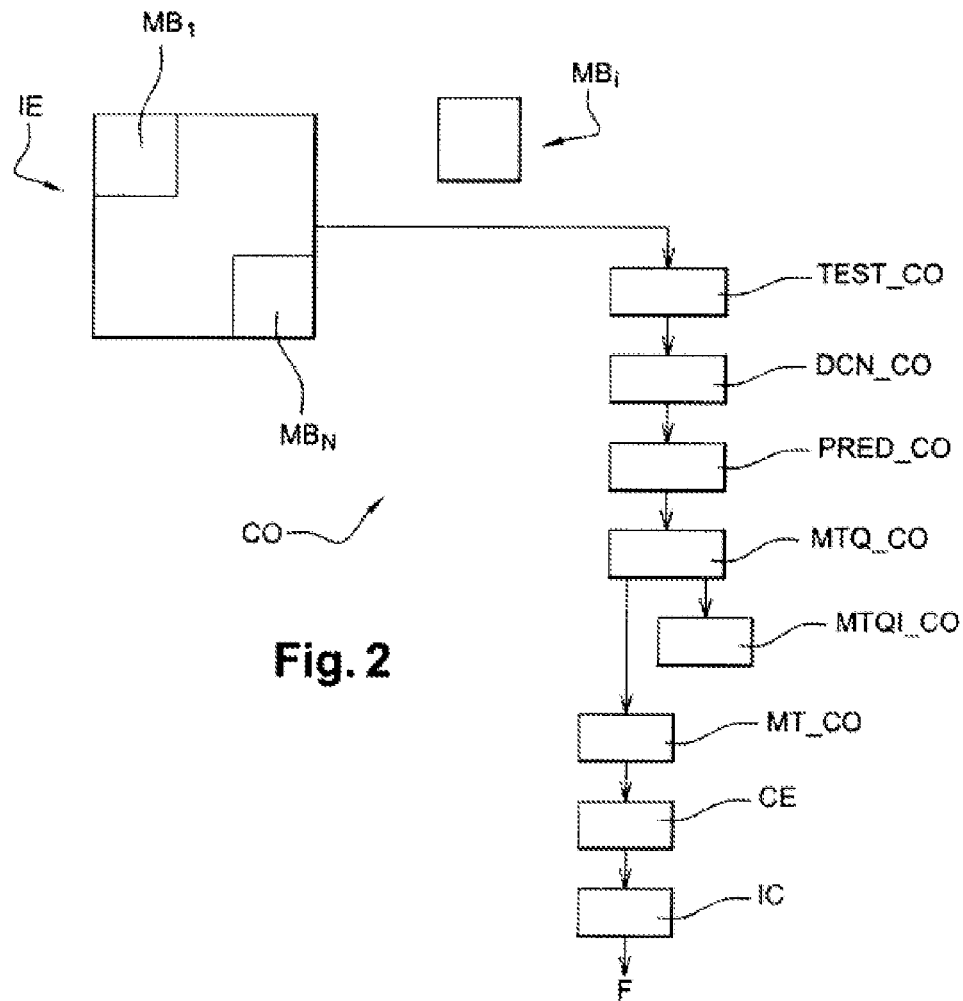
FIG. 2 represents an embodiment of a coding device according to the invention.

According to the embodiment of the invention, the coding method according to the invention is implemented in a coding device CO represented in FIG. 2.

Figure 1:
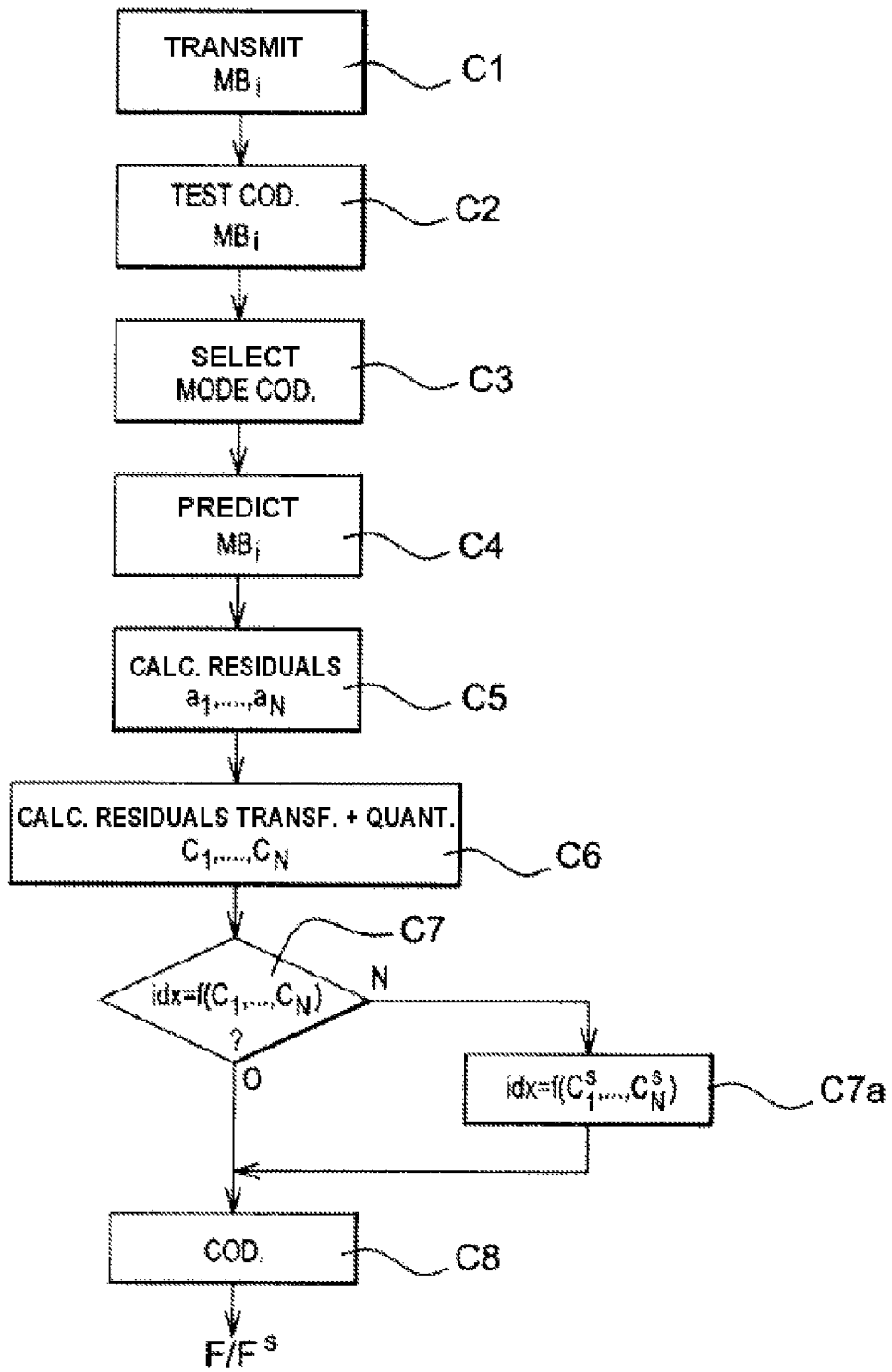
FIG. 1 represents steps of the coding method according to the invention.

The first step C1, represented in FIG. 1, is the transmission, to a coding modes test module TEST_CO, of a current macroblock $MB_i$ to be coded, belonging to an image IE of the sequence of images to be coded.

Such a test module TEST_CO is represented in FIG. 2.

In the course of a step C2 represented in FIG. 1, the module TEST_CO calculates the various possible predictions of the macroblock $MB_i$, considered.

For this purpose, the module TEST_CO tests several modes of coding so as to predict the macroblock $MB_i$ on the basis of a plurality of n_i coding information items in competition, where i represents the type of coding information items considered and n_i its associated values.

In this set of n_i coding information items:
the mode of prediction constitutes the first i=1 coding information item, with n_1=7, since there are for example seven possible modes of prediction, namely 4×4 Intra, 16×16 Intra, 16×16 Inter, 16×8 Inter, 8×16 Inter, 8×8 Inter and Skip;
the reference images in Inter mode constitute the second i=2 coding information item, with n_2=3 since the maximum number of reference images may be for example fixed at 3, in accordance with the H264 standard;
the type of DCT transform constitutes the third i=3 coding information item, with n_3=2, since there are two possible choices for this DCT, namely 4×4 DCT or 8×8 DCT, in accordance with the H264 standard.

Once the various possible modes of coding have been tested by the TEST_CO module, in the course of a step C3 represented in FIG. 1, a decision module DCN_CO, represented in FIG. 2, selects a mode of coding and its associated coding information items, such a selection constituting the optimal prediction according to a performance criterion which, in the example represented, is the rate distortion criterion well known to the person skilled in the art. Such a criterion is expressed by equation (1) hereinbelow:

$$J=D+\lambda R \text{ where} \quad (1)$$

D represents the distortion between the original macroblock and the reconstructed macroblock, R represents the cost in bits of the coding of the coding information items and λ represents a Lagrange multiplier.

In the example represented, the coding information items associated with the mode of coding which have been selected are:
the 8×8 Inter mode,
the immediately preceding reference image $IE_{N-1}$,
the 4×4 DCT.

Figure 3:
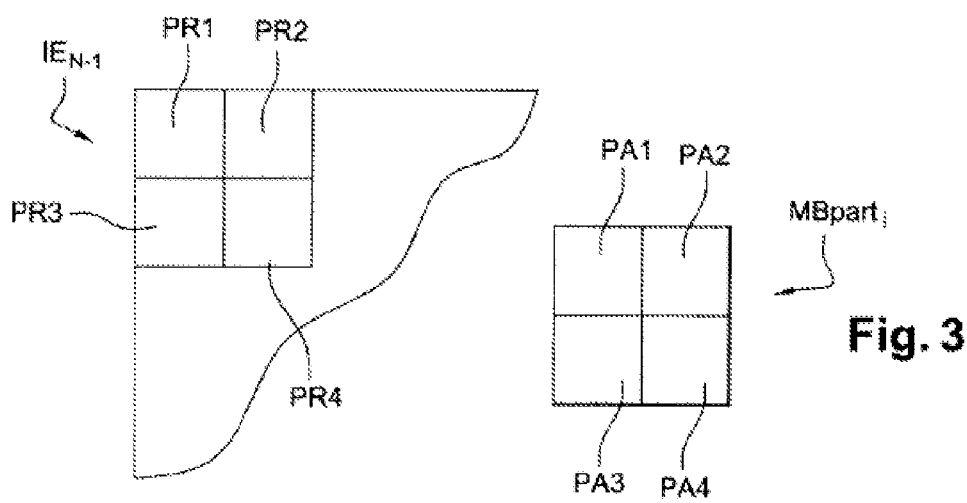
FIG. 3 represents a mode of macroblock coding selected in the coding device according to the invention.

FIG. 3 represents the macroblock $MBpart_i$ which has been obtained on completion of said selection. In the example represented, the macroblock $MBpart_i$, comprises four partitions PA1, PA2, PA3 and PA4 which, for example, all have the shape of a square and the same number of pixels.

In the course of a prediction step C4 represented in FIG. 1, a calculation module PRED_CO represented in FIG. 2, predicts, in accordance with the mode of coding selected in step C3, each current partition PA1, PA2, PA3, PA4, with respect to a corresponding reference partition PR1, PR2, PR3, PR4 which is contained in the immediately preceding image $IE_{N-1}$.

With reference to FIG. 2, such a reference partition is previously coded in accordance with the H.264/MPEG-4AVC standard, that is to say it undergoes, in a manner known per se:
a coding by discrete cosine transform and quantization which is performed by a transform and quantization module MTQ_CO,
and then a decoding by inverse discrete cosine transform and inverse quantization, which is performed by the inverse transform and quantization module MTQI_CO.

In the course of a step C5 represented in FIG. 1, the calculation module PRED_CO determines residual data $a_1$, $a_2, \ldots, a_N$, by comparing the data relating to each current partition PA1, PA2, PA3, PA4, respectively with the data relating to each predicted partition obtained $PA_p\mathbf{1}$, $PA_p\mathbf{2}$, $PA_p\mathbf{3}$, $PA_p\mathbf{4}$.

In the course of a step C6 represented in FIG. 1, the residual data $a_1, a_2, \ldots, a_N$, are dispatched to the transform and quantization module MTQ_CO represented in FIG. 2, so as to undergo a discrete cosine transform and then a quantization.

It is assumed that for a predicted partition, N transformed and quantized residual data are obtained. Such transformed and quantized residual data are denoted for example $c_1$, $c_2, \ldots, c_N$.

In accordance with the invention, in the course of a step C7 represented in FIG. 1, a processing module MT_CO, represented in FIG. 2:
- calculates the value of a function representative of the coefficients $c_1, c_2, \ldots, c_N$ previously obtained,
- compares the calculated value with the value of at least an ith of the coding information items associated with the mode of coding selected in step C3.

According to a first embodiment, such a function consists in calculating the modulo n of the sum of the coefficients $c_1$, $c_2, \ldots, c_N$ previously obtained, where n represents the number of possible values taken by the ith coding information item.

Let us assume, in the example represented, that the processing module MT_CO chooses, for the comparison, the third aforementioned coding information item n__3=2, which corresponds to the selected type of DCT transform. In the example represented, it is the 4×4 DCT which has been selected by the decision module DCN_CO as competition index idx=0.

Consequently, in the course of step C7, the processing module MT_CO calculates $$\left(\sum_{i=1}^{N} c_i\right) \% \text{ n\_3, with n\_3} = 2.$$

If $$idx = \left(\sum_{i=1}^{N} c_i\right) \% \text{ n\_3},$$

the current predicted partition is coded, in the course of a step C8 represented in FIG. 1, as in the H.264/MPEG-4 AVC standard, with the exception of the competition index idx whose value has been compared. More precisely with reference to FIG. 4A, a slice T1 of said coded partition comprises a field CH1 specifying the selected mode of prediction, 8×8 Inter in the example represented, a field CH2 indicating the reference image or images used, the immediately preceding image $IE_{N-1}$ in the example represented, and a field CH3 containing the coded values of the coefficients $c_1, c_2, \ldots, c_N$.

The slice of T1 with these quantized coefficients is thereafter transmitted to entropy coding module CE represented in FIG. 2, so as to produce a, binary, video stream F coded according to the invention, that is to say not containing the competition index idx relating to the 4×4 DCT.

If $$idx \neq \left(\sum_{i=1}^{N} c_i\right) \% \text{ n\_3},$$

one or more coefficients $c_1, \ldots, c_N$ are modified in the course of a step $C7_a$ in such a way that the modulo n__3 of the sum of said coefficients is equal to the index idx to be transmitted to the decoder.

For this purpose, a modification coefficient $s_i$ is applied to one or more coefficients $c_1, \ldots, c_N$ so as to obtain modified coefficients $c^s i = c_i + s_i$.

The values of $s_i$ are selected so as to satisfy the three conditions hereinbelow:

$$-idx = \left(\sum_{i=1}^{N} c_i^s\right) \% \text{ n\_3}$$

$R_{ref} - R_k < \zeta(idx)$ where $R_{ref}$ represents the rate cost before modification of one or more coefficients $c_1, \ldots, c_N$, $R_k$ represents the rate cost subsequent to the modification of one or more coefficients $c_1, \ldots, c_N$ and $\zeta(idx)$ the cost in bits of the coding of the index idx in accordance with the conventional approach used in the prior art.

$J = \arg\min J_k$ with $J_k = D_k + \lambda R_k$, $D_k$ and $R_k$ being calculated for each modified value $c_i^s$.

Thus, in the example represented where n__3=0 and is therefore even, $s_i = \{-5, -3, -1, 1, 3, 5\}$, said values of $s_i$ being odd values so as to change the parity of $$\left(\sum_{i=1}^{N} c_i^s\right) \% \text{ n\_3}.$$

In the course of the aforementioned step C8, the current predicted partition is then coded as in the H.264/MPEG-4 AVC standard, with the exception of the competition index idx whose value has been compared. More precisely with reference to FIG. 4B, a slice $T^s\mathbf{1}$ of said coded current partition comprises a field CH1 specifying the selected mode of prediction, 8×8 Inter in the example represented, a field CH2 indicating the reference image or images used, the immediately preceding image $IE_{N-1}$ in the example represented, and a field CH3 containing the coded values of one or more modified coefficients $c^s_1, c^s_2, c^s_N$.

The slice of $T^s\mathbf{1}$ with these quantized coefficients is thereafter transmitted to the entropy coding module CE, so as to produce a, binary, video stream $F^s$ coded according to the invention, that is to say containing one or more modified residual coefficients $c^s_1, c^s_2, \ldots, c^s_N$, but not containing the competition index relating to the 4×4 DCT.

According to another embodiment, instead of calculating the value of the function $$\left(\sum_{i=1}^{N} c_i\right) \% \text{ n\_i},$$

the processing module MT_CO calculates a number n'_i of equal coefficients in succession with n'i≤n_i+1.

Thus, in the example represented where n__3=2, if the processing module MT_CO calculates, in the course of the aforementioned step C7, that n'_i=2, the current predicted partition is coded as in the course of the aforementioned step C8, with the exception of the competition index idx whose value has been compared.

If on the other hand, the processing module MT_CO calculates, in the course of the aforementioned step C7, that n'_i=3, one or more coefficients $c_1, \ldots, c_N$ are then incremented or decremented by a value $s'_i$ so as to obtain n'_i=2. The current predicted partition is then coded as in the course of the aforementioned step C8, with the exception of the competition index idx whose value has been compared, and while taking into account the modified coefficients $c^{s'}_1, \ldots, c^{s'}_N$.

It should moreover be noted that in the case where one or more of said partitions of the macroblock $MB_i$ is not associated with any coding information item, in the course of the aforementioned step C6, the residual data $w_1, \ldots, w_R$ of the partition or partitions devoid of coding information items are also dispatched to the transform and quantization module MTQ_CO, so as to undergo a discrete cosine transform and then a quantization. Such transformed and quantized residual data are denoted for example $r_1, r_2, \ldots, r_N$.

Thus, in the course of the aforementioned step C7, the processing module MT_CO:
- calculates the value of a function representative of the coefficients $c_1, c_2, \ldots, c_N, r_1, r_2, \ldots, r_N$ previously obtained and,
- compares the calculated value with the value of at least an ith of the coding information items associated with the mode of coding selected in step C3.

The binary stream F or $F^s$ thus coded is transmitted via a communication interface IC of the coding device, via a communication network, to a remote terminal. The latter comprises a decoder DO such as represented in FIG. 5.

The binary stream F or FS is firstly dispatched to an entropy decoding module DE, the decoding inverse to that performed by the entropy coding module CE represented in FIG. 2. Next, for each partition to be reconstructed, the coefficients decoded by the module DE are dispatched to an inverse quantization and inverse transform module QTI_DO.

An image reconstruction module RI, such as represented in FIG. 5, then receives decoded data corresponding to the data produced by the module DCN_CO (FIG. 2) in the coding step C3 according to the invention, to within transmission errors. The module RI implements steps D1 to D4 of the decoding method according to the invention, such as are represented in FIG. 6.

Such a decoding method according to the invention is also implemented in a software or hardware manner by modifications of a decoder initially complying with the H.264/MPEG-4 AVC standard.

The decoding according to the invention is now described mainly with reference to FIGS. 5 and 6.

The first step D1 is the decoding of data structures coded in a slice T1 or $T^s1$ of a current partition of the image IE to be decoded. In a manner known per se, a calculation module CAL_DO determines on the basis of the data of said slice, contained in the aforementioned fields CH1, CH2, and CH3:
- the mode of prediction selected, 8×8 Inter in the example represented,
- the reference image used, the immediately preceding image $IE_{N-1}$ in the example represented,
- the residual coefficients $c_1, c_2, \ldots, c_N$ or the modified residual coefficients $c^s_1, c^s_2, \ldots, c^s_N$.

In the course of a step D2, in accordance with the invention, a processing module $MT_{-DO}$, which resembles in all respects that represented in FIG. 2, calculates according to the binary stream F or $F^s$ to be decoded, the value idx of a function representative either of the coefficients $c_1, c_2, \ldots, c_N$ contained in the field CH3 (FIG. 4A), or of the coefficients $c^s_1, c^s_2, \ldots, c^s_N$ contained in the field CH'3 (FIG. 4B).

Thus, the processing module MT_DO calculates for each partition of a macroblock $MB_i$ to be decoded:
- in accordance with the first aforementioned embodiment, either the value of the function $$\left(\sum_{i=1}^{N} c_i\right) \% \, n\_3,$$

in the case of the decoding of the stream F, or the value of the function $$\left(\sum_{i=1}^{N} c^s_i\right) \% \, n\_3,$$

in the case of the decoding of the stream $F^s$;
- in accordance with the second aforementioned embodiment, either the number of decoded coefficients $c_1, c_2, \ldots, c_N$ equal in succession, in the case of the decoding of the stream F, or the number of decoded coefficients $c^{s'}_1, \ldots, c^{s'}_N$ equal in succession, in the case of the decoding of the stream $F^s$.

The calculated value obtained on completion of step D2 then corresponds to the value of the competition index idx=0 which relates, in the example represented, to the choice of the 4×4 DCT by the decision module DON-CO during the coding. In the course of a step D3, a prediction module PRED_DO, which is in all respects similar to the prediction module PRED_CO of the coder CO of FIG. 2, delivers a predicted macroblock $MB_i$ on the basis of the data decoded in steps D1 and D2, for each of the partitions of this macroblock.

The predicted macroblock $MB_i$ is thereafter decoded, in the course of a step D4, as in the H.264/MPEG-AVC standard.

Once all the macroblocks $MB_i$ of the image IE have been decoded, the image reconstruction module RI provides as output from the decoder DO, an image IDE corresponding to the decoding of the image IE.

It goes without saying that the embodiments which have been described hereinabove have been given purely by way of wholly non-limiting indication, and that numerous modifications may easily be made by the person skilled in the art without however departing from the scope of the invention.

The invention claimed is:

1. A method for coding an image split up into partitions, said method comprising:
- selection of at least one mode of coding, wherein the mode of coding is associated with specific values of a plurality of coding information items, each coding information item having a number of possible values; and selecting the associated specific values of the coding information items;
- prediction, with the aid of said selected mode of coding, of the data of a current partition as a function of at least one already coded reference partition, delivering a predicted partition;
- determination of residual data, by comparing data relating to said current partition and to said predicted partition;
- transmission of a data signal comprising at least said determined residual data and said coding information items associated with the mode of coding selected,
- choosing one of the coding information items;
wherein, prior to the transmission step, the method comprises:
- calculation of the value of a function representative of the residual data determined, which function is calculated modulo the number of possible values associated with the chosen coding information item, comparison of said calculated value with the specific value of the chosen coding information item, in case of equality between the two values, the data signal transmitted comprises the residual data determined and the specific values of the coding information items associated with the mode of coding selected, with the exclusion of said chosen coding information item, and in case of inequality between the two values, modification of the determined residual data so that the value of the function representative of the residual data is equal to the specific value of the chosen coding information item, the data signal transmitted comprising the modified residual data and the coding information items associated with the mode of coding selected, with the exclusion of said chosen coding information item.

2. The coding method as claimed in claim 1, wherein the calculating modulo the number of possible values consists in calculating the modulo of the sum of said residual data.

3. The coding method as claimed in claim 1, wherein calculating the value of the function representative of the residual data comprises calculating a number $n'\_i \leq n\_i+1$ of determined residual data which are equal in succession.

4. The coding method as claimed in claim 1, comprising:
calculation of the value of a coding performance criterion at each modification of at least one of said determined residual data, and
selection of the modification of said at least one residual datum which corresponds to the highest calculated value of the performance criterion.

5. The coding method as claimed in claim 1, wherein when said image is split up into at least two partitions, one of which is not associated with any coding information item, the value of the function representative of the residual data is calculated on the basis of the residual data of said partitions.

6. A method for decoding a data signal representative of an image split up into partitions which has been previously coded, said signal comprising residual data relating to at least one previously coded partition and specific values of a plurality of coding information items associated with a mode of coding of said partition with the exclusion of a chosen coding information item, said chosen coding information item having a number of possible values, the method comprising:
decoding said specific values of said coding information items;
decoding said residual data, said decoded residual data corresponding to either residual data which have not been modified at the coding or residual data which have been modified at the coding;
decoding the chosen coding information item by:
calculation of the value of a function representative of the decoded residual data, which function is calculated modulo the number of possible values of said chosen coding information item; and
using the calculated value to identify a corresponding specific value from among the possible values of said chosen coding information item.

7. The decoding method as claimed in claim 6, wherein the calculating modulo the number of possible values comprises calculating the modulo of the sum of said residual data.

8. The decoding method as claimed in claim 6, wherein the step of calculating the value of the function representative of the residual data comprises calculating a number of decoded residual data equal in succession.

9. A device for coding an image split up into partitions, said device comprising:
means for selecting at least one mode of coding, wherein the mode of coding is associated with specific values of a plurality of coding information items, each coding information item having a number of possible values; and selecting the associated specific values of the coding information items;
means for predicting, with the aid of said selected mode of coding, the data of a current partition as a function of at least one already coded reference partition, so as to deliver a predicted partition;
means for determining residual data, by comparing data relating to said current partition and to said predicted partition;
means for transmitting a data signal comprising at least said determined residual data and said coding information items associated with the mode of coding selected, wherein the coding device comprises processing means which are linked between said means for determining residual data and said transmission means, said processing means being able to choose one of the coding information items, to calculate the value of a function representative of the residual data determined, which function is calculated modulo the number of possible values associated with the chosen coding information item, and to compare said calculated value with the specific value of the chosen coding information item,
in such a way that:
in case of equality between the two values, the data signal intended to be transmitted by said transmission means contains the residual data determined and the coding information items associated with the mode of coding selected, with the exclusion of said chosen coding information item, and
in case of inequality between the two values, said processing means modify the residual data determined so that the value of the function representative of the residual data is equal to the specific value of the chosen coding information item, the data signal intended to be transmitted by said transmission means containing the modified residual data and the coding information items associated with the mode of coding selected, with the exclusion of said chosen coding information item.

10. A device for decoding a data signal representative of an image split up into partitions which has been previously coded, said signal comprising residual data relating to at least one previously coded partition and specific values of a plurality of coding information items associated with a mode of coding of said partition with the exclusion of a chosen coding information item, said chosen coding information item having a number of possible values, wherein the decoding device is operative to:
decode said specific values of said coding information items;
decode said residual data, said decoded residual data corresponding to either residual data that were not modified at the coding or residual data that were modified at the coding; and
decode the chosen coding information item by:
calculating the value of a function representative of the decoded residual data, which function is calculated modulo the number of possible values of said chosen coding information item; and
using the calculated value to identify a corresponding specific value from among the possible values of said chosen coding information item.

11. A non-transitory computer program product comprising instructions for implementing a method for coding an image split up into partitions, said method comprising:
selection of at least one mode of coding, wherein the mode of coding is associated with specific values of a plurality of coding information items, each coding information item having a number of possible values; and selecting the associated specific values of the coding information items;

prediction, with the aid of said selected mode of coding, of the data of a current partition as a function of at least one already coded reference partition, delivering a predicted partition;

determination of residual data, by comparing data relating to said current partition and to said predicted partition;

transmission of a data signal comprising at least said determined residual data and said coding information items associated with the mode of coding selected, choosing one of the coding information items;

wherein, prior to the transmission step, the method comprises:

calculation of the value of a function representative of the residual data determined, which function is calculated modulo the number of possible values associated with the chosen coding information item, comparison of said calculated value with the specific value of the chosen coding information item, in case of equality between the two values, the data signal transmitted comprises the residual data determined and the specific values of the coding information items associated with the mode of coding selected, with the exclusion of said chosen coding information item, and in case of inequality between the two values, modification of the determined residual data so that the value of the function representative of the residual data is equal to the specific value of the chosen coding information item, the data signal transmitted comprising the modified residual data and the coding information items associated with the mode of coding selected, with the exclusion of said chosen coding information item;

when the instructions are executed on a computer.

12. A non-transitory computer program product comprising instructions for implementing a method for decoding a data signal representative of an image split UP into partitions which has been previously coded, said signal comprising residual data relating to at least one previously coded partition and specific values of a plurality of coding information items associated with a mode of coding of said partition with the exclusion of a chosen coding information item, said chosen coding information item having a number of possible values, the method comprising:

decoding said specific values of said coding information items;

decoding said residual data, said decoded residual data corresponding to either residual data which have not been modified at the coding or residual data which have been modified at the coding;

decoding the chosen coding information item by:
calculation of the value of a function representative of the decoded residual data, which function is calculated modulo the number of possible values of said chosen coding information item; and
using the calculated value to identify a corresponding specific value from among the possible values of said chosen coding information item;

when the instructions are executed on a computer.

* * * * *